United States Patent
Nuñez et al.

(10) Patent No.: US 11,345,773 B2
(45) Date of Patent: May 31, 2022

(54) WATER EXTRACTABLE OPHTHALMIC DEVICES

(71) Applicant: Bausch & Lomb Incorporated, Rochester, NY (US)

(72) Inventors: Ivan M. Nuñez, Penfield, NY (US); Lynn Coullard, Williamson, NY (US); Analuz Mark, Spencerport, NY (US); Andrew J. Hoteling, Ontario, NY (US); Joseph W. Hoff, Fairport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 39 days.

(21) Appl. No.: 16/376,136

(22) Filed: Apr. 5, 2019

(65) Prior Publication Data
US 2019/0352443 A1   Nov. 21, 2019

Related U.S. Application Data

(60) Provisional application No. 62/671,569, filed on May 15, 2018.

(51) Int. Cl.
| | | |
|---|---|---|
| *C08F 220/10* | (2006.01) | |
| *C08J 3/24* | (2006.01) | |
| *G02B 1/04* | (2006.01) | |
| *C08F 226/10* | (2006.01) | |
| *B29D 11/00* | (2006.01) | |
| *C08J 3/075* | (2006.01) | |

(52) U.S. Cl.
CPC ...... *C08F 226/10* (2013.01); *B29D 11/00134* (2013.01); *C08J 3/075* (2013.01); *C08J 3/24* (2013.01); *G02B 1/043* (2013.01); *B29K 2039/06* (2013.01); *C08F 2800/20* (2013.01); *C08F 2810/20* (2013.01)

(58) Field of Classification Search
CPC ..... C08F 226/10; C08F 2810/20; C08J 3/075; C08J 3/24; B29K 2039/06; G02B 1/043
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 4,113,224 A | 9/1978 | Clark et al. |
| 4,197,266 A | 4/1980 | Clark et al. |
| 4,555,732 A | 11/1985 | Tuhro |
| 4,910,277 A | 3/1990 | Bambury et al. |
| 5,070,215 A | 12/1991 | Bambury et al. |
| 5,271,875 A | 12/1993 | Appleton et al. |
| 5,449,729 A * | 9/1995 | Lai .......................... C07C 69/96 526/286 |
| 5,998,498 A | 12/1999 | Vanderlaan et al. |
| 6,020,445 A | 2/2000 | Vanderlaan et al. |
| 7,901,073 B2 | 3/2011 | Nunez et al. |
| 7,915,323 B2 | 3/2011 | Awasthi et al. |
| 7,994,356 B2 | 8/2011 | Awasthi et al. |
| 8,053,489 B2 | 11/2011 | Nunez et al. |
| 8,252,850 B2 | 8/2012 | Nunez et al. |
| 8,420,711 B2 | 4/2013 | Awasthi et al. |
| 8,703,891 B2 | 4/2014 | Broad |
| 8,807,745 B2 * | 8/2014 | Nunez ..................... G02C 7/04 351/159.33 |
| 8,827,447 B2 * | 9/2014 | Awasthi ................ C08F 230/08 351/159.24 |
| 8,937,110 B2 | 1/2015 | Alli et al. |
| 8,937,111 B2 | 1/2015 | Alli et al. |
| 8,967,799 B2 | 3/2015 | Nunez et al. |
| 9,039,174 B2 | 5/2015 | Awasthi et al. |
| 9,075,187 B2 | 7/2015 | Nunez et al. |
| 9,156,934 B2 | 10/2015 | Alli et al. |
| 9,244,197 B2 | 1/2016 | Alli et al. |
| 2009/0018233 A1 * | 1/2009 | Nunez ................... C08F 230/08 523/107 |
| 2011/0085128 A1 | 4/2011 | Liu et al. |
| 2013/0313733 A1 | 11/2013 | Nunez et al. |
| 2016/0243279 A1 * | 8/2016 | Liska ...................... A61P 19/08 |
| 2017/0017016 A1 | 1/2017 | Alli et al. |

FOREIGN PATENT DOCUMENTS

| | | |
|---|---|---|
| WO | 2007146312 A2 | 12/2007 |
| WO | PCT/US2019/025956 | 7/2019 |

* cited by examiner

*Primary Examiner* — Karuna P Reddy
(74) *Attorney, Agent, or Firm* — Ryan, Mason & Lewis, LLP

(57) ABSTRACT

A water extractable ophthalmic device is disclosed which is a polymerization product of a monomeric mixture comprising: (a) one or more cyclic lactams; (b) one or more non-bulky organosilicon-containing monomers; (c) one or more bulky siloxane monomers; and (d) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group. The water extractable ophthalmic device has an equilibrium water content of at least about 50 wt. %, a contact angle of less than about 50°, and an oxygen permeability of at least about 60 Barrers.

38 Claims, No Drawings

WATER EXTRACTABLE OPHTHALMIC DEVICES

BACKGROUND

The present invention generally relates to water extractable ophthalmic devices and methods for their preparation.

Soft contact lenses have been available since the 1980s. It is important that contact lenses be comfortable and safe to wear. A hydrogel is a hydrated cross-linked polymeric system that contains water in an equilibrium state. Hydrogels typically are oxygen permeable and biocompatible, making them a preferred material for producing biomedical devices and in particular contact or intraocular lenses.

Soft contact lens materials are made by polymerizing and crosslinking hydrophilic monomers such as 2-hydroxyethyl methacrylate (HEMA) or N-vinyl pyrrolidone (NVP). The polymers produced by polymerizing these hydrophilic monomers exhibit significant hydrophilic character themselves and are capable of absorbing a significant amount of water in their polymeric matrices. Due to their ability to absorb water, these polymers are often referred to as "hydrogels". These hydrogels are optically clear and, due to their high levels of water of hydration, are useful materials for making soft contact lenses. However, these hydrogels are known to have poor levels of oxygen permeability.

Thus, there has been a shift towards the introduction of silicone-containing monomers to increase the oxygen permeability. Silicone-containing polymers generally have higher oxygen permeabilities than conventional hydrogels. Siloxane-type monomers are well known to be poorly soluble in water as well as hydrophilic solvents and monomers and are therefore difficult to copolymerize and process using standard hydrogel techniques.

Thus, there remains a need for an ophthalmic device which is made with silicone-containing monomers and is extractable in water instead of the organic solvents.

SUMMARY

In accordance with one embodiment of the present invention, a water extractable ophthalmic device is provided which is a polymerization product of a monomeric mixture comprising: (a) one or more cyclic lactams; (b) one or more non-bulky organosilicon-containing monomer; (c) one or more bulky siloxane monomers; and (d) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group, wherein the water extractable ophthalmic device has an equilibrium water content of at least about 50 wt. %, a contact angle of less than about 50°, and an oxygen permeability of at least about 60 Barrers.

In accordance with a second embodiment of the present invention, a method for making a water extractable ophthalmic device is provided which comprises (a) curing a monomeric mixture in a mold, the monomer mixture comprising (i) one or more cyclic lactams; (ii) one or more non-bulky organosilicon-containing monomer; (ii) one or more bulky siloxane monomers; and (iv) a crosslinking agent mixture comprising (1) one or more first crosslinking agents containing at least two ethylenically unsaturated reactive end groups, wherein the at least two ethylenically unsaturated reactive end groups are (meth)acrylate-containing reactive end groups and (2) one or more second crosslinking agents containing at least two ethylenically unsaturated reactive end groups wherein at least one of the ethylenically unsaturated reactive end groups is a non-(meth)acrylate reactive end group; and (b) dry releasing the ophthalmic device from the mold to provide a water extractable ophthalmic device having an equilibrium water content of at least about 50 wt. %, a contact angle of less than about 30°, and an oxygen permeability of at least about 60 Barrers.

The water extractable ophthalmic device of the present invention is believed to provide a higher level of performance quality and/or comfort to the users due to their hydrophilic or lubricious (or both) surfaces. Hydrophilic and/or lubricious surfaces of the water extractable ophthalmic devices herein such as contact lenses substantially prevent or limit the adsorption of tear lipids and proteins on, and their eventual absorption into, the lenses, thus preserving the clarity of the contact lenses. This, in turn, preserves their performance quality thereby providing a higher level of comfort to the wearer.

DETAILED DESCRIPTION

The illustrative embodiments described herein are directed to water extractable ophthalmic devices. Although the illustrative embodiments are applicable to a variety of water extractable ophthalmic devices, one particular illustrative embodiment is especially useful and advantageous for water extractable contact lenses. As used herein, the terms "ophthalmic device" and "lens" refer to devices that reside in or on the eye. These devices can provide optical correction, wound care, drug delivery, diagnostic functionality, cosmetic enhancement or any combination of these properties. Representative examples of such devices include, but are not limited to, soft contact lenses, e.g., soft, hydrogel lenses, soft, non-hydrogel lenses and the like, intraocular lenses, overlay lenses, ocular inserts, optical inserts, bandage lenses and therapeutic lenses and the like. As is understood by one skilled in the art, a lens is considered to be "soft" if it can be folded back upon itself without breaking. The high water content ophthalmic devices such as high water content contact lenses of the illustrative embodiments can be spherical, toric, bifocal, may contain cosmetic tints, opaque cosmetic patterns, combinations thereof and the like.

In general, the water extractable ophthalmic device described herein is a polymerization product of a monomeric mixture comprising: (a) one or more cyclic lactams; (b) one or more non-bulky organosilicon-containing monomer, (c) one or more bulky siloxane monomers; and (d) a crosslinking agent mixture comprising (i) one or more first crosslinking agents containing at least two ethylenically unsaturated reactive end groups, wherein the at least two ethylenically unsaturated reactive end groups are (meth) acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group, wherein the water extractable ophthalmic device has an equilibrium water content of at least about 50 wt. %, a contact angle of less than about 30°, and an oxygen permeability of at least about 60 Barrers.

In one illustrative embodiment, a water extractable ophthalmic device according to the present invention has an equilibrium water content of from about 50 wt. % to about 70 wt. %, a contact angle of from about 30° to about 50°, and an oxygen permeability of at least about 60 Barrers, e.g., from about 60 to about 100 Barrers. In another illustrative embodiment, a water extractable ophthalmic device according to the present invention has an equilibrium water content of from about 55 wt. % to about 65 wt. %, a contact angle of from about 30° to about 45°, and an oxygen permeability of at least about 70 Barrers, e.g., from about 70 to about 100 Barrers.

The monomeric mixture includes one or more cyclic lactams. Suitable one or more cyclic lactams include, for example, N-vinyl-2-pyrrolidone, N-vinyl caprolactam, N-vinyl-2-piperidone and mixtures thereof. The one or more cyclic lactams are present in the monomeric mixture in an amount of no more than about 55 wt. %, based on the total weight of the monomeric mixture. In one embodiment, the one or more cyclic lactams are present in the monomeric mixture in an amount of from about 40 wt. % to about 55 wt. %, based on the total weight of the monomeric mixture.

The monomeric mixture further includes one or more non-bulky organosilicon-containing monomer. An "organosilicon-containing monomer" as used herein contains at least one [siloxanyl] or at least one [silyl-alkyl-siloxanyl] repeating unit, in a monomer, macromer or prepolymer. In one embodiment, one or more non-bulky organosilicon-containing monomers can comprise a compound represented by a structure of Formula I:

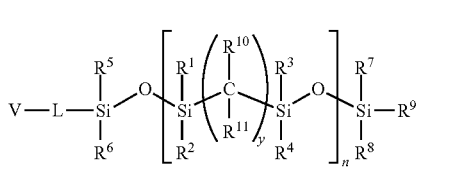
(I)

wherein V is ethylenically unsaturated polymerizable group, L is a linker group or a bond; $R^1$, $R^2$, $R^3$, $R^4$, $R^5$, $R^6$, $R^7$, $R^8$, and $R^9$ are independently H, $C_3$ to $C_{12}$ alkyl, halo alkyl, $C_3$ to $C_{12}$ cycloalkyl, heterocycloalkyl, $C_2$ to $C_{12}$ alkenyl, haloalkenyl, or $C_6$ to $C_{12}$ aromatic; $R^{10}$, and $R^{11}$ are independently H or $C_1$ to $C_{12}$ alkyl wherein at least one of $R^{10}$ and $R^{11}$ is hydrogen; y is 2 to 7 and n is 1 to 100 or from 1 to 20.

Ethylenically unsaturated polymerizable groups are well known to those skilled in the art. Suitable ethylenically unsaturated polymerizable groups include, for example, (meth)acrylates, vinyl carbonates, O-vinyl carbamates, N-vinyl carbamates, and (meth)acrylamides. As used herein, the term "(meth)" denotes an optional methyl substituent. Thus, terms such as "(meth)acrylate" denotes either methacrylate or acrylate, and "(meth)acrylamide" denotes either methacrylamide or acrylamide.

Linker groups can be any divalent radical or moiety and include, for example, substituted or unsubstituted $C_1$ to $C_{12}$ alkyl, alkyl ether, alkenyls, alkenyl ethers, halo alkyls, substituted or unsubstituted siloxanes, and monomers capable of propagating ring opening.

In one embodiment, V is a (meth)acrylate, L is a $C_1$ to $C_{12}$ alkylene, $R^1$, $R^2$, $R^3$, $R^4$, $R^5$, $R^6$, $R^7$, $R^8$, and $R^9$ are independently a $C_1$ to $C_{12}$ alkyl, $R^{10}$ and $R^{11}$ are independently H, y is 2 to 7 and n is 3 to 8.

In one embodiment, V is a (meth)acrylate, L is a $C_1$ to $C_6$ alkyl, $R^1$, $R^2$, $R^3$, $R^4$, $R^5$, $R^6$, $R^7$, $R^8$, and $R^9$ are independently a $C_1$ to $C_6$ alkyl, $R^{10}$ and $R^{11}$ are independently H, y is 2 to 7 and n is 1 to 20.

Non-bulky organosilicon-containing monomers represented by a structure of Formula I are known in the art, see, e.g., U.S. Pat. Nos. 7,915,323, 7,994,356, 8,420,711, 8,827,447 and 9,039,174, the contents of which are incorporated by reference herein.

In one embodiment, one or more non-bulky organosilicon-containing monomers can comprise a compound represented by a structure of Formula II:

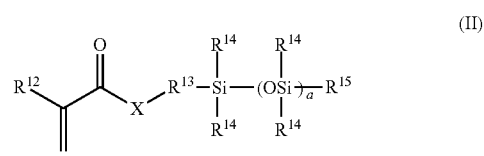
(II)

wherein $R^{12}$ is H or methyl; X is O or $NR^{16}$; wherein $R^{16}$ is selected from H, or $C_1$ to $C_4$ alkyl, which may be further substituted with one or more hydroxyl groups, and in some embodiments is H or methyl; $R^3$ is a divalent alkyl group, which may further be functionalized with a group selected from the group consisting of ether groups, hydroxyl groups, carbamate groups and combinations thereof, and in another embodiment $C_1$ to $C_6$ alkylene groups which may be substituted with ether, hydroxyl and combinations thereof, and in yet another embodiment $C_1$ or $C_3$ to $C_4$ alkylene groups which may be substituted with ether, hydroxyl and combinations thereof; each $R^{14}$ is independently a phenyl or $C_1$ to $C_4$ alkyl which may be substituted with fluorine, hydroxyl or ether, and in another embodiment each $R^{14}$ is independently selected from ethyl and methyl groups, and in yet another embodiment, each $R^{14}$ is methyl; $R^1$ is a $C_1$ to $C_4$ alkyl; a is 2 to 50, and in some embodiments 5 to 15.

Non-bulky organosilicon-containing monomers represented by a structure of Formula II are known in the art, see, e.g., U.S. Pat. Nos. 8,703,891, 8,937,110, 8,937,111, 9,156,934 and 9,244,197, the contents of which are incorporated by reference herein.

In general, the one or more non-bulky organosilicon-containing monomers can be present in the monomeric mixture in an amount ranging from about 5 wt. % to about 30 wt. %, based on the total weight of the monomeric mixture. In one embodiment, the one or more non-bulky organosilicon-containing monomers can be present in the monomeric mixture in an amount ranging from about 15 wt. % to about 25 wt. %, based on the total weight of the monomeric mixture.

The monomeric mixture further includes one or more bulky siloxane monomers. In one embodiment, a suitable bulky siloxane monomer is represented by the structure of Formula III:

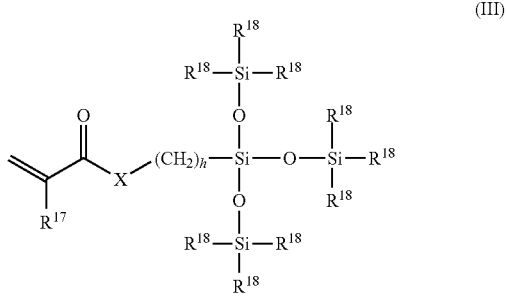
(III)

wherein X denotes —COO—, —CONR$^{19}$—, —OCOO—, or —OCONR$^{19}$— where each R$^{19}$ is hydrogen or a C$_1$-C$_4$ alkyl; R$^{17}$ independently denotes hydrogen or methyl; each R$^{18}$ independently denotes a lower alkyl radical such as a C$_1$-C$_6$ alkyl, a phenyl radical or a group represented by

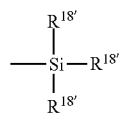

wherein each R$^{18'}$ independently denotes a lower alkyl such as a C$_1$-C$_6$ alkyl, or phenyl radical; and h is 1 to 10.

In one embodiment, a suitable bulky siloxane monomer is a bulky polysiloxanylalkyl carbamate monomers as generally depicted in Formula IV:

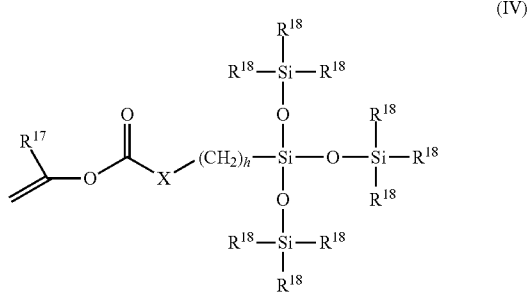

wherein X denotes —NR$^{19}$—; wherein R$^{19}$ denotes hydrogen or a C$_1$-C$_4$ alkyl; R$^{17}$ denotes hydrogen or methyl; each R$^{18}$ independently denotes a lower alkyl radical such as a C$_1$-C$_6$ alkyl, a phenyl radical or a group represented by

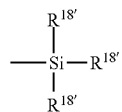

wherein each R$^{18'}$ independently denotes a lower alkyl such as a C$_1$-C$_6$ alkyl, or a phenyl radical; and h is 1 to 10.

Suitable one or more bulky siloxane monomers include, for example, methacryloxypropyl tris(trimethylsiloxy)silane ("TRIS"), pentamethyldisiloxanyl methylmethacrylate, tris(trimethylsiloxy)methacryloxy propylsilane, phenyltretramethyl-disloxanylethyl acrylate, methyldi(trimethyl siloxy) methacryloxymethyl silane, 3-[tris(trimethylsiloxy)silyl] propyl vinyl carbamate, 3-[tris(trimethylsiloxy)silyl] propyol allyl carbamate, 3-[tris(trimethylsiloxy)silyl]propyl vinyl carbonate and mixtures thereof.

In general, the one or more bulky siloxane monomers can be present in the monomeric mixture in an amount ranging from about 12 wt. % to about 30 wt. %, based on the total weight of the monomeric mixture. In one embodiment, the one or more bulky siloxane monomers can be present in the monomeric mixture in an amount ranging from about 15 wt. % to about 26 wt. %, based on the total weight of the monomeric mixture.

The monomeric mixture further includes a crosslinking agent mixture comprising (i) one or more first crosslinking agents containing at least two ethylenically unsaturated reactive end groups, wherein the ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group. In one illustrative embodiment, useful one or more first crosslinking agents containing at least two ethylenically unsaturated reactive end groups, wherein the ethylenically unsaturated reactive end groups are (meth)acrylate-containing reactive end groups include, for example, one or more di-, tri- or tetra(meth)acrylate-containing crosslinking agents.

In one illustrative embodiment, useful one or more di-, tri- or tetra(meth)acrylate-containing crosslinking agents include alkanepolyol di-, tri- or tetra(meth)acrylate-containing crosslinking agents such as, for example, one or more alkylene glycol di(meth)acrylate crosslinking agents, one or more alkylene glycol tri(meth)acrylate crosslinking agents, one or more alkylene glycol tetra(meth)acrylate crosslinking agents, one or more alkanediol di(meth)acrylate crosslinking agents, alkanediol tri(meth)acrylate crosslinking agents, alkanediol tetra(meth)acrylate crosslinking agents, agents, one or more alkanetriol di(meth)acrylate crosslinking agents, alkanetriol tri(meth)acrylate crosslinking agents, alkanetriol tetra(meth)acrylate crosslinking agents, agents, one or more alkanetetraol di(meth)acrylate crosslinking agents, alkanetetraol tri(meth)acrylate crosslinking agents, alkanetetraol tetra(meth)acrylate crosslinking agents and the like and mixtures thereof.

In one embodiment, one or more alkylene glycol di(meth)acrylate crosslinking agents include tetraethylene glycol dimethacrylate, ethylene glycol di(meth)acrylates having up to about 10 ethylene glycol repeating units, butyleneglycol di(meth)acrylate and the like. In one embodiment, one or more alkanediol di(meth)acrylate crosslinking agents include butanediol di(meth)acrylate crosslinking agents, hexanediol di(meth)acrylate and the like. In one embodiment, one or more alkanetriol tri(meth)acrylate crosslinking agents are trimethylol propane trimethacrylate crosslinking agents. In one embodiment, one or more alkanetetraol tetra(meth)acrylate crosslinking agents are pentaerythritol tetramethacrylate crosslinking agents.

In one illustrative embodiment, useful one or more second crosslinking agents containing at least two ethylenically unsaturated reactive end groups wherein at least one of the ethylenically unsaturated reactive end groups is a non-(meth)acrylate reactive end group include one or more di-, tri- or tetracarbamate-containing crosslinking agents, one or more di-, tri- or tetracarbonate-containing crosslinking agents, one or more isocyanurate-containing crosslinking agents and the like and mixtures thereof.

Representative examples of one or more di-, tri- or tetracarbamate-containing crosslinking agents include one or more di(N-vinylcarbamate)-containing crosslinking agents, one or more di(N-allylcarbamate)-containing crosslinking agents, one or more di(O-vinylcarbamate)-containing crosslinking agents, one or more di(O-allylcarbamate)-containing crosslinking agents, one or more tri(N-vinylcarbamate)-containing crosslinking agents, one or more tri(N-allylcarbamate)-containing crosslinking agents, one or more tri(O-vinylcarbamate)-containing crosslinking agents, one or more tri(O-allylcarbamate)-containing crosslinking agents, one or more tetra(N-vinylcarbamate)-containing crosslinking agents, one or more tetra (N-allylcarbamate)-containing crosslinking agents, one or more tetra (O-vinylcarbamate)-containing crosslinking agents, one or more tetra(O-allylcarbamate)-containing crosslinking agents, and the like and mixtures thereof.

Representative examples of one or more di-, tri- or tetracarbonate-containing crosslinking agents include a di(O-vinylcarbonate)-containing crosslinking agent, a di(O-allylcarbonate)-containing crosslinking agent, a tri(O-vinylcarbonate)-containing crosslinking agent, a tri(O-allylcarbonate)-containing crosslinking agent, a tetra(O-vinylcarbonate)-containing crosslinking agent, a tetra(O-allylcarbonate)-containing crosslinking agent, and the like and mixtures thereof.

Representative examples of one or more isocyanurate-containing crosslinking agents include one or more diallyl isocyanurate, triallyl isocyanurate, divinyl isocyanurate, trivinyl isocyanurate, and the like and mixtures thereof.

In one embodiment, one or more di-carbamate-containing crosslinking agents include bis (N-vinyl carbamates) having the following structure of Formula V:

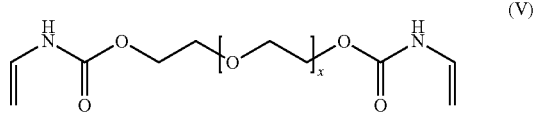

wherein x is from 0 to 10.

In one embodiment, one or more di-carbamate-containing crosslinking agents include bis (O-vinyl carbamates) having the following structure of Formula VI:

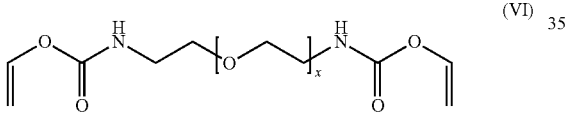

wherein x is from 0 to 10.

In one embodiment, one or more di-carbamate-containing crosslinking agents include diethylene glycol bis(N-vinylcarbamate), diethylene glycol bis(O-allylcarbamate), and the like and mixtures thereof.

In one embodiment, the one or more second crosslinking agents are selected are from the group consisting of diethylene glycol bis(N-vinylcarbamate), diethylene glycol bis(N-allylcarbamate), diethylene glycol bis(O-vinylcarbamate), diethylene glycol bis(O-allylcarbamate), and mixtures thereof, 1,4-butanediol bis(N-vinylcarbamate), ethylene glycol bis(O-vinyl carbonate), diethylene glycol bis(O-vinyl carbonate), 1,4-butanediol bis(O-vinyl carbonate) and mixtures thereof.

In one embodiment, the one or more second crosslinking agents containing at least two ethylenically unsaturated reactive end groups include crosslinking agents containing at least one allyl-containing reactive end group and at least one (meth)acrylate-containing reactive end group. In one embodiment, the one or more second crosslinking agents include crosslinking agents containing allyl methacrylate end groups In one embodiment, the one or more second crosslinking agents containing at least two ethylenically unsaturated reactive end groups can be represented by the structure of Formula VII:

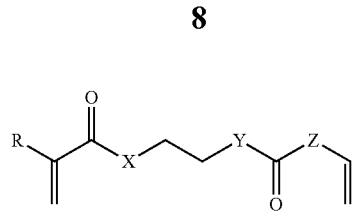

wherein R is hydrogen or methyl; and X, Y and Z are independently O or NH. Representative examples of suitable crosslinkers of Formula VII include those having the following structures:

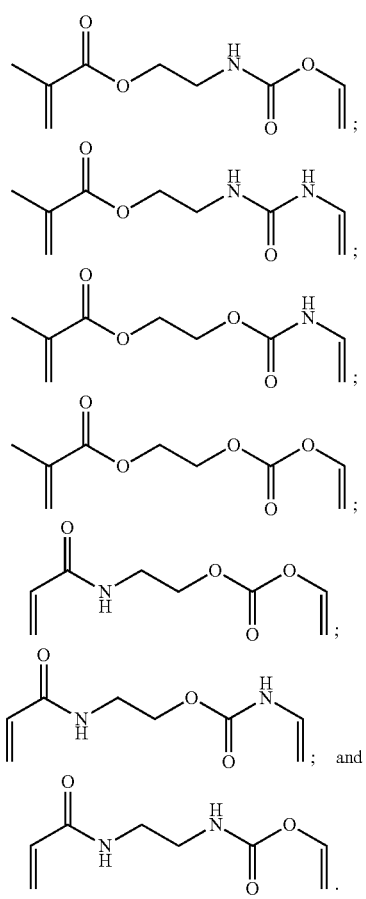

In one embodiment, the one or more second crosslinking agents containing at least two ethylenically unsaturated reactive end groups can be represented by the structure of Formula VIII:

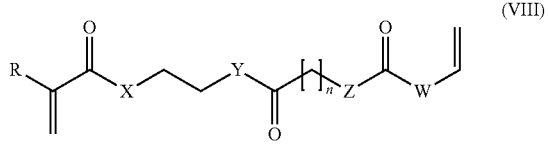

wherein R is hydrogen or methyl; X is O; Y is O or NH; Z is NH; W is O and n is from 2 to 6. Representative examples of suitable crosslinkers of formula VIII include those having the following structures:

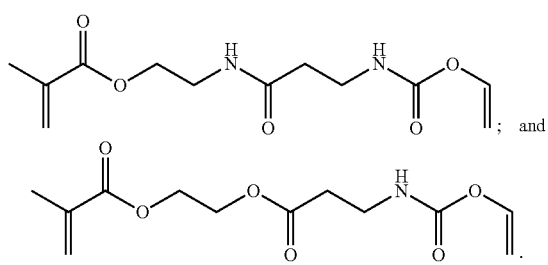

In one embodiment, the one or more second crosslinking agents containing at least two ethylenically unsaturated reactive end groups can be represented by the structure of Formula IX:

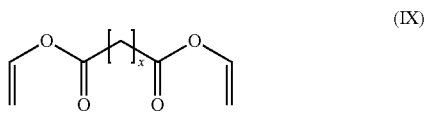

wherein x is from 2 to 10.

In general, the one or more first crosslinking agents are present in the monomeric mixture in an amount of about 0.01 to about 2 wt. %, based on the total weight of the monomeric mixture, and the second crosslinking agent is present in the monomer mixture in an amount of about 0.01 to about 3 wt. %, based on the total weight of the monomeric mixture.

If desired, the monomeric mixture can further include a minor amount of one or more additional hydrophilic monomers other than NVP as discussed above. Suitable additional hydrophilic monomers include, for example, amides, hydroxyl-containing (meth)acrylates, poly(alkene glycols) functionalized with polymerizable groups and the like and mixtures thereof. Representative examples of amides include alkylamides such as N,N-dimethylacrylamide, N,N-dimethylmethacrylamide and the like and mixtures thereof. Representative examples of hydroxyl-containing (meth) acrylates include 2-hydroxyethyl methacrylate (HEMA), glycerol methacrylate and the like and mixtures thereof. Representative examples of functionalized poly(alkene glycols) include poly(diethylene glycols) of varying chain length containing monomethacrylate or dimethacrylate end caps. In one embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. Mixtures of the foregoing additional hydrophilic monomers can also be used in the monomeric mixtures herein. In one embodiment, the one or more additional hydrophilic monomer is HEMA.

In general, a minor amount of the one or more additional hydrophilic monomers is an amount of less than or equal to about 10 wt. %, e.g., an amount ranging from about 0.25 to about 10 wt. %, based on the total weight of the monomeric mixture.

The monomeric mixture can further include a diluent. Suitable diluents include at least one or more boric acid esters of a $C_1$ to $C_8$ monohydric alcohol, water-soluble or partly water-soluble monohydric alcohols and mixtures thereof. Suitable boric acid esters of a $C_1$ to $C_8$ monohydric alcohol include, for example, trimethyl borate, triethyl borate, tri-n-propyl borate, triisopropyl borate, tri-n-butyl borate, and tri-tert-butyl borate. Suitable water-soluble or partly water-soluble monohydric alcohols include, for example, monohydric alcohols having from 1 to 5 carbon atoms such as methanol, ethanol, isopropyl alcohol, 1-propanol, t-butyl alcohol, 2-butyl alcohol, 2-methyl-1-propanol, t-amyl alcohol and other $C_5$ isomers.

In one embodiment, the monomeric mixture contains about 5 weight percent to about 50 weight percent of the diluent, based on the total weight of the monomeric mixture. In one embodiment, the monomeric mixture contains about 15 wt. % to about 30 wt. % of the diluent, based on the total weight of the monomer mixture.

The monomeric mixture can further include one or more hydrophobic monomers. Suitable hydrophobic monomers include, for example, ethylenically unsaturated hydrophobic monomers such as, for example, (meth)acrylates-containing hydrophobic monomers, N-alkyl (meth)acrylamides-containing hydrophobic monomers, alkyl vinylcarbonates-containing hydrophobic monomers, alkyl vinylcarbamates-containing hydrophobic monomers, fluoroalkyl (meth) acrylates-containing hydrophobic monomers, N-fluoroalkyl (meth)acrylamides-containing hydrophobic monomers, N-fluoroalkyl vinylcarbonates-containing hydrophobic monomers, N-fluoroalkyl vinylcarbamates-containing hydrophobic monomers, silicone-containing (meth)acrylates-containing hydrophobic monomers, (meth)acrylamides-containing hydrophobic monomers, vinyl carbonates-containing hydrophobic monomers, vinyl carbamates-containing hydrophobic monomers, styrenic-containing hydrophobic monomers, polyoxypropylene (meth)acrylate-containing hydrophobic monomers and the like and mixtures thereof. As used herein, the term "(meth)" denotes an optional methyl substituent. Thus, terms such as "(meth) acrylate" denotes either methacrylate or acrylate, and "(meth)acrylamide" denotes either methacrylamide or acrylamide.

In one illustrative embodiment, the one or more hydrophobic monomers is represented by the structure of Formula X:

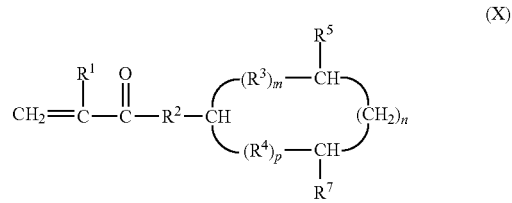

wherein $R^1$ is methyl or hydrogen; $R^2$ is —O— or —NH—; $R^3$ and $R^4$ are independently a divalent radical selected from the group consisting of —CH$_2$—, —CHOH— and —CHR$^6$—; $R^5$ and $R^6$ are independently a branched $C_3$-$C_5$ alkyl group; $R^7$ is hydrogen or —OH; n is an integer of at least 1, and m and p are independently 0 or an integer of at least 1, provided that the sum of m, p and n is 2, 3, 4 or 5.

Representative examples of one or more hydrophobic monomers represented by the structure of Formula X include, but are not limited to, 4-t-butyl-2-hydroxycyclohexyl methacrylate (TBE); 4-t-butyl-2-hydroxycyclopentyl methacrylate; 4-t-butyl-2-hydroxycyclohexyl methacrylamide (TBA); 6-isopentyl-3-hydroxycyclohexyl methacrylate; 2-isohexyl-5-hydroxycyclopentyl methacrylamide, 4-t-butylcyclohexyl methacrylate, isobornyl methacrylate, adamantyl methacrylate, n-butyl methacrylate, n-hexyl methacrylate, lauryl methacrylate, benzyl methacrylate, and the like. In one embodiment, one or more hydrophobic monomers (b) include compounds of Formula X wherein $R^3$ is —$CH_2$—, m is 1 or 2, p is 0, and the sum of m and n is 3 or 4.

The one or more hydrophobic monomers can be present in the monomeric mixture in an amount ranging from about 0.5 wt. % to about 25 wt. %, based on the total weight of the monomeric mixture. In one embodiment, the one or more hydrophobic monomers can be present in the monomeric mixture in an amount ranging from about 1 wt. % to about 10 wt. %, based on the total weight of the monomeric mixture.

In another illustrative embodiment, the monomeric mixture can further include one or more ultraviolet (UV) blockers. In one embodiment, useful UV blockers include one or more compounds represented by the following structures:

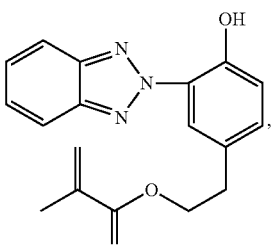

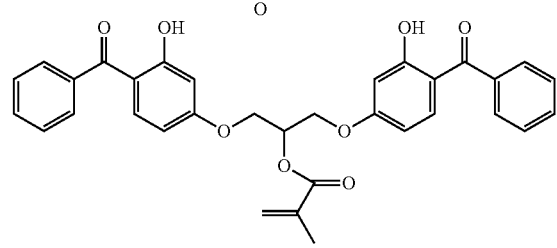

(2-Propenoic acid, 2-methyl,2-(4-benzoyl-3-hydroxyphenoxy)-1-[(4-benzoyl3-hydroxyphenoxy)methyl ester),

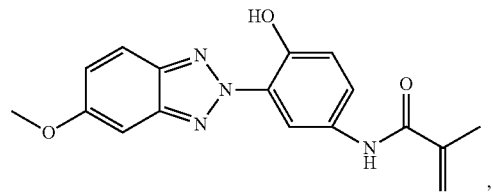

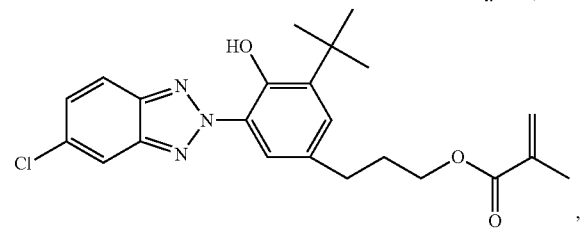

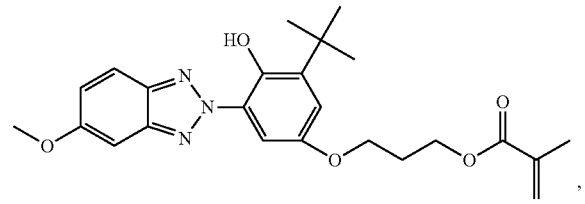

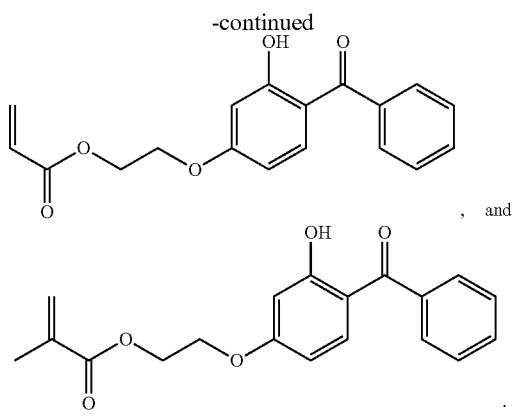

, and

The monomeric mixture may further contain, as necessary and within limits not to impair the purpose and effect of the present invention, various additives such as an antioxidant, coloring agent, lubricant, internal wetting agent, toughening agent and the like and other constituents as are well known in the art.

The ophthalmic devices of the illustrative embodiments, e.g., contact lenses or intraocular lenses, can be prepared by polymerizing the foregoing monomeric mixtures to form a product that can be subsequently formed into the appropriate shape by, for example, lathing, injection molding, compression molding, cutting and the like. For example, in producing contact lenses, the initial mixture may be polymerized in tubes to provide rod-shaped articles, which are then cut into buttons. The buttons may then be lathed into contact lenses.

Alternately, the ophthalmic devices such as contact lenses may be cast directly in molds, e.g., polypropylene molds, from the mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the mixtures to be polymerized to a mold, and spinning the mold in a controlled manner while exposing the mixture to a radiation source such as UV light. Static casting methods involve charging the monomeric mixture between two mold sections, one mold section shaped to form the anterior lens surface and the other mold section shaped to form the posterior lens surface, and curing the mixture while retained in the mold assembly to form a lens, for example, by free radical polymerization of the mixture. Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization may be facilitated by exposing the mixture to heat (thermal cure) and/or radiation, such as ultraviolet light, visible light, or high energy radiation. A polymerization initiator may be included in the mixture to facilitate the polymerization step. Representative examples of free radical thermal polymerization initiators include organic peroxides such as acetyl peroxide, lauroyl peroxide, decanoyl peroxide, stearoyl peroxide, benzoyl peroxide, tertiarylbutyl peroxypivalate, peroxydicarbonate, and the like. Representative examples of diazo initiators include VAZO 64, and VAZO 67. Representative UV initiators are those known in the art and include benzoin methyl ether, benzoin ethyl ether, Darocure® 1173, 1164, 2273, 1116, 2959, 3331 (EM Industries) and Irgacure® 651 and 184 (Ciba-Geigy). Representative visible light initiators include IRGACURE 819 and other phosphine oxide-type initiators, and the like. Generally, the initiator will be employed in the monomeric mixture at a concentration of about 0.01 to about 5 percent by weight of the total mixture.

Polymerization is generally performed in a reaction medium, such as, for example, a solution or dispersion using a solvent, e.g., water or an alkanol containing from 1 to 4 carbon atoms such as methanol, ethanol or propan-2-ol. Alternatively, a mixture of any of the above solvents may be used.

Generally, polymerization can be carried out for about 15 minutes to about 72 hours, and under an inert atmosphere of, for example, nitrogen or argon. If desired, the resulting polymerization product can be dried under vacuum, e.g., for about 5 to about 72 hours or left in an aqueous solution prior to use.

Polymerization of the mixtures will yield a polymer, that when hydrated, preferably forms a hydrogel. When producing a hydrogel lens, the mixture may further include at least a diluent as discussed above that is ultimately replaced with water when the polymerization product is hydrated to form a hydrogel. Generally, the water content of the hydrogel is as described hereinabove, i.e., at least about 50 wt. %. The amount of diluent used should be less than about 50 wt. % and in most cases, the diluent content will be less than about 30 wt. %. However, in a particular polymer system, the actual limit will be dictated by the solubility of the various monomers in the diluent. In order to produce an optically clear copolymer, it is important that a phase separation leading to visual opacity does not occur between the comonomers and the diluent, or the diluent and the final copolymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol; glycerine; liquid poly(ethylene glycol); alcohols; alcohol/water mixtures; ethylene oxide/propylene oxide block copolymers; low molecular weight linear poly(2-hydroxyethyl methacrylate); glycol esters of lactic acid; formamides; ketones; dialkylsulfoxides; butyl carbitol, borates as discussed herein and the like and mixtures thereof.

If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired, the mixture used to produce the hydrogel lens may further include crosslinking and wetting agents known in the prior art for making hydrogel materials.

In the case of intraocular lenses, the monomeric mixtures to be polymerized may further include a monomer for increasing the refractive index of the resultant polymerized product. Examples of such monomers include aromatic (meth) acrylates, such as phenyl (meth)acrylate, 2-phenylethyl (meth)acrylate, 2-phenoxyethyl methacrylate, and benzyl (meth)acrylate.

The ophthalmic devices such as contact lenses obtained herein may be subjected to optional machining operations. For example, the optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative. The examples should not be read as limiting the scope of the invention as defined in the claims.

Various polymerization products were formed as discussed below and characterized by standard testing procedures such as:

Oxygen permeability (also referred to as Dk) is determined by the following procedure. Other methods and/or instruments may be used as long as the oxygen permeability values obtained therefrom are equivalent to the described method. The oxygen permeability of silicone hydrogels is measured by the polarographic method (ANSI Z80.20-1998) using an O2 Permeometer Model 201T instrument (Createch, Albany, Calif. USA) having a probe comprising a central, circular gold cathode at its end and a silver anode insulated from the cathode. Measurements are taken only on pre-inspected pinhole-free, flat silicone hydrogel film samples of three different center thicknesses ranging from 150 to 600 microns. Center thickness measurements of the film samples may be measured using a Rehder ET-1 electronic thickness gauge. Generally, the film samples have the shape of a circular disk. Measurements are taken with the film sample and probe immersed in a bath comprising circulating phosphate buffered saline (PBS) equilibrated at 35° C.+/−0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample. For silicone hydrogel films, it is frequently useful to employ a Teflon polymer membrane, e.g., having a circular disk shape, between the probe cathode and the film sample. In such cases, the Teflon membrane is first placed on the pre-moistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value. At least two Dk measurements per thickness, and meeting R2 value, are obtained. Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/−8.8% of the Repository values established by William J. Benjamin, et al., The Oxygen Permeability of Reference Materials, Optom Vis Sci 7 (12s): 95 (1997), the disclosure of which is incorporated herein in its entirety.

Water %: Two sets of six hydrated lenses or films are blotted dry on a piece of filter paper to remove excess water, and samples are weighed (wet weight). Samples are then placed in a microwave oven for 10 minutes inside ajar containing desiccant. The samples are then allowed to sit for 30 minutes to equilibrate to room temperature and reweighed (dry weight). The percent water is calculated from the wet and dry weights.

Contact Angle (CBCA): Captive bubble contact angle data was collected on a First Ten Angstroms FTA-1000 prop Shape Instrument. All samples were rinsed in HPLC grade water prior to analysis in order to remove components of the packaging solution from the sample surface. Prior to data collection the surface tension of the water used for all experiments was measured using the pendant drop method. In order for the water to qualify as appropriate for use, a surface tension value of 70-72 dynes/cm was expected. All lens samples were placed onto a curved sample holder and submerged into a quartz cell filled with HPLC grade water. Advancing and receding captive bubble contact angles were collected for each sample. The advancing contact angle is defined as the angle measured in water as the air bubble is retracting from the lens surface (water is advancing across the surface). All captive bubble data was collected using a high speed digital camera focused onto the sample/air bubble interface. The contact angle was calculated at the digital frame just prior to contact line movement across the sample/air bubble interface. The receding contact angle is defined as the angle measured in water as the air bubble is expanding across the sample surface (water is receding from the surface).

Modulus (g/mm$^2$) and % elongation were measured per ASTM 1708 employing an Instron (Model 4502) instrument where the film sample was immersed in borate buffered saline; an appropriate size of the film sample was gauge length 22 mm and width 4.75 mm, where the sample further has ends forming a dogbone shape to accommodate gripping of the sample with clamps of the Instron instrument, and a thickness of 100±50 microns.

Tensile strength (g/mm$^2$) was measured per ASTM test method Dl 708a.

Tear strength was measured according to ASTM D-1938 under the same physical conditions as for tensile modulus.

Sagittal depth (SAG) as measured on a Deltronic Comparator.

In the examples, the following abbreviations are used.

HEMA: 2-hydroxyethyl methacrylate.

NVP: N-vinyl-2-pyrrolidone.

AMA: Allyl methacrylate.

TRIS: tris(trimethylsiloxy)silylpropyl methacrylate.

SIGMA: (3-methacryloxy-2-hydroxy propoxy)propyl bis(trimethyl siloxy)methyl silane.

Tetraethylene glycol dimethacrylate (TEGDMA): a compound of the following structure:

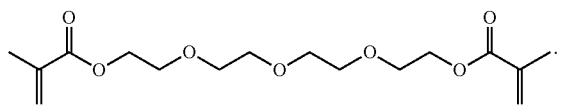 [SMILES: C=C(C)C(=O)OCCOCCOCCOCCOC(=O)C(=C)C]

Vazo™ 64: azo bis-isobutylnitrile (AIBN).

CIX-4: a compound having the structure:

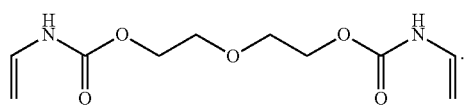 [SMILES: C=CNC(=O)OCCOCCOC(=O)NC=C]

SA monomer: a compound having the structure:

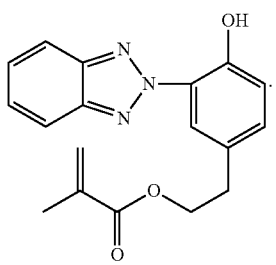 [SMILES: C=C(C)C(=O)OCCc1ccc(O)c(-n2nc3ccccc3n2)c1]

MIEDS6: a compound having the structure and available from Gelest:

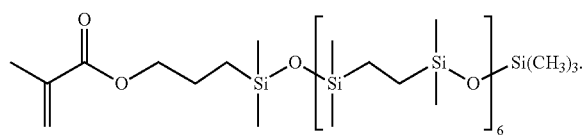

MCR-M11: a compound having the structure:

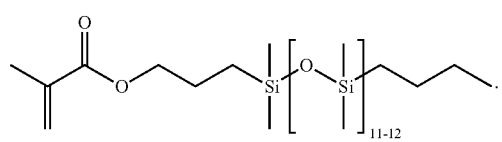

M1-MCR-C12: a compound having the structure:

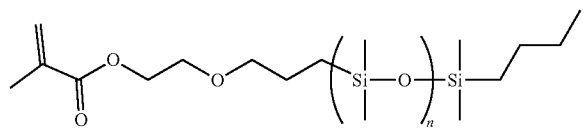

wherein n is an average of 12.

Example 1

A monomer mix was made by mixing the following components, listed in Table 1 at amounts per weight.

TABLE 1

| Ingredient | Weight Percent |
|---|---|
| $M_1$-$EDS_6$ | 15 |
| TRIS | 26.5 |
| NVP | 50.15 |
| HEMA | 7.5 |
| TEGDMA | 0.75 |
| CIX-4 | 0.1 |
| Monomer Mix (total) | 100.00 |
| Tri-t-butyl borate | 23 |
| SA Monomer | 2 |
| VAZO 64 | 0.5 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

Example 2

A monomer mix was made by mixing the following components, listed in Table 2 at amounts per weight.

TABLE 2

| Ingredient | Weight Percent |
|---|---|
| MCR-M11 | 25 |
| TRIS | 17 |
| NVP | 50.15 |
| HEMA | 7 |
| TEGDMA | 0.75 |
| CIX-4 | 0.1 |
| Monomer Mix (total) | 100.00 |
| Tri-t-butyl borate | 23 |
| VAZO 64 | 0.5 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

Example 3

A monomer mix was made by mixing the following components, listed in Table 3 at amounts per weight.

TABLE 3

| Ingredient | Weight Percent |
|---|---|
| $M_1$-$EDS_6$ | 15 |
| TRIS | 26.5 |
| NVP | 50.15 |
| HEMA | 7.5 |
| TEGDMA | 0.75 |
| CIX-4 | 0.1 |
| Monomer Mix (total) | 100.00 |
| SA Monomer | 2 |
| Tri-t-butyl borate | 23 |
| VAZO 64 | 0.5 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

Example 4

A monomer mix was made by mixing the following components, listed in Table 4 at amounts per weight.

TABLE 4

| Ingredient | Weight Percent |
|---|---|
| MCR-$M_{11}$ | 25 |
| TRIS | 17 |
| NVP | 50.2 |
| HEMA | 7 |
| TEGDMA | 0.75 |
| CIX-4 | 0.1 |
| Monomer Mix (total) | 100.00 |
| t-amyl OH | 23 |
| VAZO 64 | 0.5 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

Example 5

A monomer mix was made by mixing the following components, listed in Table 5 at amounts per weight.

TABLE 5

| Ingredient | Weight Percent |
|---|---|
| MCR-$M_{11}$ | 20.28 |
| TRIS | 20.4 |
| NVP | 53.44 |
| HEMA | 4.76 |
| TEGDMA | 1.02 |
| AMA | 0.1 |
| Monomer Mix (total) | 100.00 |
| Tri-t-butyl borate | 10 |
| VAZO 64 | 0.79 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

Example 6

A monomer mix was made by mixing the following components, listed in Table 6 at amounts per weight.

TABLE 6

| Ingredient | Weight Percent |
|---|---|
| $M_1$-MCR-$C_{12}$ | 20.28 |
| TRIS | 20.4 |
| NVP | 51.2 |
| HEMA | 7.27 |
| TEGDMA | 0.75 |
| AMA | 0.1 |
| Monomer Mix (total) | 100.00 |
| t-amyl OH | 10 |
| VAZO 64 | 0.5 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

Example 7

A monomer mix was made by mixing the following components, listed in Table 7 at amounts per weight.

TABLE 7

| Ingredient | Weight Percent |
|---|---|
| $M_1$-MCR-$C_{12}$ | 19.9 |
| TRIS | 20.1 |
| NVP | 52.5 |
| HEMA | 4.68 |
| TEGDMA | 1.5 |
| Monomer Mix (total) | 100.00 |
| n-propanol | 15 |
| VAZO 64 | 0.79 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

Example 8

A monomer mix was made by mixing the following components, listed in Table 8 at amounts per weight.

TABLE 8

| Ingredient | Weight Percent |
|---|---|
| $M_1$-MCR-$C_{12}$ | 25 |
| SIGMA | 10 |
| TRIS | 15 |
| NVP | 42.8 |
| HEMA | 7 |
| TEGDMA | 0.1 |
| AMA | 0.1 |
| Monomer Mix (total) | 100.00 |
| t-amyl OH | 23 |
| VAZO 67 | 0.5 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

Example 9

A monomer mix was made by mixing the following components, listed in Table 9 at amounts per weight.

TABLE 9

| Ingredient | Weight Percent |
|---|---|
| EDS-PDMS Monofunctional | 21.5 |
| TRIS | 23.5 |
| NVP | 47 |
| HEMA | 7 |
| TEGDMA | 0.75 |
| CIX-4 | 0.25 |
| Monomer Mix (total) | 100.00 |
| Tri-t-butyl borate | 23 |
| VAZO 64 | 0.5 |
| Tint | 0.02 |

The resultant monomeric mixture was cast into contact lenses by introducing the monomer mixture to a polypropylene mold assembly. Then, the mold assembly and monomer mixture were thermally cured for about 3 hours to form a contact lens. The resultant contact lenses were released from the mold assembly.

The lens obtained in each of Examples 1-9 were characterized by standard testing procedures as set forth below in Table 10.

TABLE 10

| Example | Dk | Modulus | Tear Strength | CBCA | Diameter | Sag | WC % |
|---|---|---|---|---|---|---|---|
| Example 1 | 89 | 52 | 4 | 38 | 15.413 | 4.216 | 58 |
| Example 2 | 80 | 52 | 4 | 46 | 13.642 | 3.727 | 58 |
| Example 3 | 75 | 66 | 6 | 38 | 15.222 | 4.149 | 57 |
| Example 4 | — | 58 | 5 | 38 | — | — | 57 |
| Example 5 | 70 | 78 | — | 40 | 13.922 | 3.735 | 56 |
| Example 6 | 87 | 53 | 3 | 35 | — | — | 60 |

TABLE 10-continued

| Example | Dk | Modulus | Tear Strength | CBCA | Diameter | Sag | WC % |
|---|---|---|---|---|---|---|---|
| Example 7 | 85 | 77 | 3 | 41 | — | — | 55.6 |
| Example 8 | 86 | 39 | 5 | 55 | — | — | 56 |

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A water extractable ophthalmic device which is a polymerization product of a monomeric mixture comprising:
   (a) one or more cyclic lactams;
   (b) one or more non-bulky organosilicon-containing monomers;
   (c) one or more bulky siloxane monomers; and
   (d) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups, and (ii) one or more second crosslinking agents containing at least two ethylenically unsaturated reactive end groups; wherein the one or more second crosslinking agents are represented by the following structure:

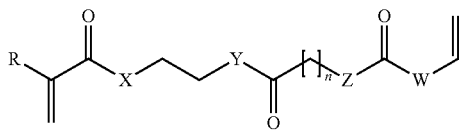

wherein R is hydrogen or methyl; X is O; Y is O or NH; Z is NH; W is O and n is from 2 to 6; and
   wherein the water extractable ophthalmic device has an equilibrium water content of at least about 50 wt. %, a contact angle of less than about 50°, and an oxygen permeability of at least about 60 Barrers.

2. The water extractable ophthalmic device of claim 1, wherein the one or more second crosslinking agents further include one or more second crosslinking agents selected from the group consisting of a di(N-vinylcarbamate)-containing crosslinking agent, a di(N-allylcarbamate)-containing crosslinking agent, a di(O-vinylcarbamate)-containing crosslinking agent, a di(O-allylcarbamate)-containing crosslinking agent, a di(O-vinylcarbonate)-containing crosslinking agent, a di(O-allylcarbonate)-containing crosslinking agent, a tri(N-vinylcarbamate)-containing crosslinking agent, a tri(N-allylcarbamate)-containing crosslinking agent, a tri(O-vinylcarbamate)-containing crosslinking agent, a tri(O-allylcarbamate)-containing crosslinking agent, a tri(O-vinylcarbonate)-containing crosslinking agent, a tri(O-allylcarbonate)-containing crosslinking agent, a tetra(N-vinylcarbamate)-containing crosslinking agent, a tetra (N-allylcarbamate)-containing crosslinking agent, a tetra(O-vinylcarbamate)-containing crosslinking agent, a tetra(O-allylcarbamate)-containing crosslinking agent, a tetra(O-vinylcarbonate)-containing crosslinking agent, a tetra(O-allylcarbonate)-containing crosslinking agent, isocyanurate-containing crosslinking agent and mixtures thereof.

3. The water extractable ophthalmic device of claim 1, wherein the one or more second crosslinking agents further include one or more second crosslinking agents represented by the following structure:

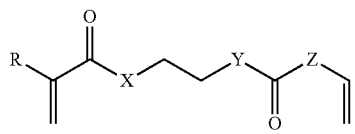

wherein R is hydrogen or methyl; and X, Y and Z are independently O or NH.

4. The water extractable ophthalmic device of claim 1, wherein the monomeric mixture comprises:
   (a) about 42 wt. % to about 55 wt. %, based on the total weight of the monomeric mixture, of the one or more cyclic lactams;
   (b) about 5 to about 25 wt. %, based on the total weight of the monomeric mixture, of the one or more non-bulky organosilicon-containing monomers;
   (c) about 10 to about 45 wt. %, based on the total weight of the monomeric mixture, of the one or more bulky siloxane monomers; and
   (d) a crosslinking agent mixture comprising (i) about 0.05 to about 2 wt. %, based on the total weight of the monomeric mixture, of the one or more first crosslinking agents and (ii) about 0.05 to about 3 wt. %, based on the total weight of the monomeric mixture, of the one or more second crosslinking agents.

5. The water extractable ophthalmic device of claim 1, wherein an amount of the one or more cyclic lactams present in the monomeric mixture is an amount of no more than about 55 wt. %, based on the total weight of the monomeric mixture.

6. The water extractable ophthalmic device of claim 1, wherein the one or more cyclic lactams are selected from the group consisting of N-vinyl-2-pyrrolidone, N-vinyl caprolactam, N-vinyl-2-piperidone and mixtures thereof.

7. The water extractable ophthalmic device of claim 1, wherein the one or more non-bulky organosilicon-containing monomers comprise a compound represented by the following structure:

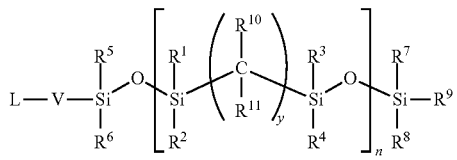

wherein L is ethylenically unsaturated polymerizable group, V is a linker group or a bond; $R^1$, $R^2$, $R^3$, $R^4$, $R^5$, $R^6$, $R^7$, $R^8$, and $R^9$ are independently hydrogen, alkyl, halo alkyl, cyclo alkyl, heterocyclo alkyl, alkenyl, halo alkenyl, or aromatic; $R^{10}$ and $R^{11}$ are independently hydrogen or alkyl wherein at least one of $R^{10}$ and $R^{11}$ is hydrogen; y is 2 to 7 and n is 1 to 100, or a compound represented by the following structure:

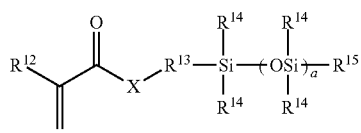

wherein $R^{12}$ is H or methyl; X is O or $NR^{16}$; wherein $R^{16}$ is hydrogen or $C_1$ to $C_4$ alkyl, which may be further substituted with one or more hydroxyl groups; $R^{13}$ is a divalent alkyl group, which may further be functionalized with a group selected from the group consisting of an ether group, a hydroxyl group, a carbamate group and combinations thereof; each $R^{14}$ is independently a phenyl or $C_1$ to $C_4$ alkyl which may be substituted with fluorine, hydroxyl or an ether; $R^{15}$ is a $C_1$ to $C_4$ alkyl; and a is 2 to 50.

8. The water extractable ophthalmic device of claim 1, wherein the one or more bulky siloxane monomers are selected from the group consisting of a bulky polysiloxanylalkyl (meth)acrylic monomer, a bulky polysiloxanylalkyl carbamate monomer and mixtures thereof.

9. The water extractable ophthalmic device of claim 1, wherein the one or more bulky siloxane monomers are represented by the following structure:

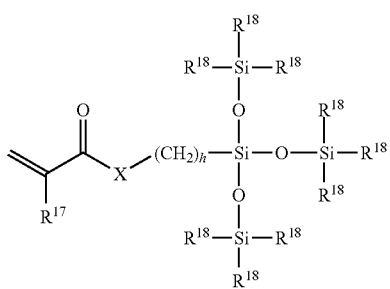

wherein X denotes —O— or —$NR^{19}$—; wherein $R^{19}$ denotes hydrogen or a $C_1$-$C_4$ alkyl where each $R^{19}$ is hydrogen or a $C_1$-$C_4$ alkyl; $R^{17}$ independently denotes hydrogen or methyl; each $R^{18}$ independently denotes a $C_1$-$C_6$ alkyl radical, a phenyl radical or a group represented by the following structure:

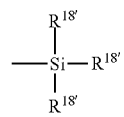

wherein each $R^{18'}$ independently denotes a $C_1$-$C_6$ alkyl radical or a phenyl radical; and his 1 to 10; or the following structure:

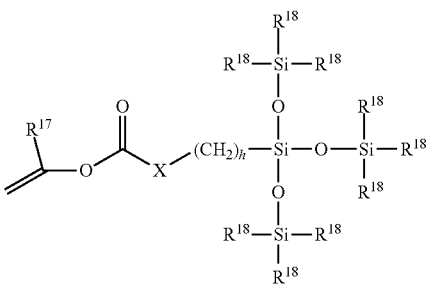

wherein X denotes —$NR^{19}$—; wherein $R^{19}$ denotes hydrogen or a $C_1$-$C_4$ alkyl; $R^{17}$ denotes hydrogen or methyl; each $R^{18}$ independently denotes a $C_1$-$C_6$ alkyl radical, a phenyl radical or a group represented by the following structure:

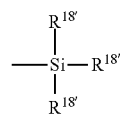

wherein each $R^{18'}$ independently denotes a $C_1$-$C_6$ alkyl radical or a phenyl radical; and h is 1 to 10.

10. The water extractable ophthalmic device of claim 1, wherein the one or more first crosslinking agents are selected from the group consisting of an alkylene glycol-containing di(meth)acrylate crosslinking agent, an alkylene glycol-containing tri(meth)acrylate crosslinking agent, an alkylene glycol-containing tetra(meth)acrylate crosslinking agent and mixtures thereof.

11. The water extractable ophthalmic device of claim 1, wherein the monomeric mixture further comprises a minor amount of 2-hydroxyethyl methacrylate (HEMA).

12. The water extractable ophthalmic device of claim 1, wherein the monomeric mixture further comprises an ultraviolet (UV) blocker.

13. The water extractable ophthalmic device of claim 1, wherein the monomeric mixture further comprises a diluent.

14. The water extractable ophthalmic device of claim 13, wherein the diluent comprises one of a boric acid ester of a $C_1$ to $C_8$ monohydric alcohol and a $C_1$ to $C_5$ monohydric alcohol.

15. The water extractable ophthalmic device of claim 1, wherein the water extractable ophthalmic device is a contact lens.

16. The water extractable ophthalmic device of claim 1, wherein the water extractable ophthalmic device is a hydrogel.

17. The water extractable ophthalmic device of claim 1, having an equilibrium water content of from about 50 wt. % to about 70 wt. %.

18. The water extractable ophthalmic device of claim 1, having an equilibrium water content of from about 50 wt. % to about 70 wt. %, a contact angle of from about 30° to about 50°, and an oxygen permeability of at least about 70 Barrers.

19. The water extractable ophthalmic device of claim 1, having an equilibrium water content of from about 55 wt. % to about 65 wt. %, a contact angle of from about 30° to about 45°, and an oxygen permeability of at least about 70 Barrers.

20. The water extractable ophthalmic device of claim 1, further having a water extractable content of less than about 15 wt. %.

21. A water extractable ophthalmic device which is a polymerization product of a monomeric mixture comprising:
(a) one or more cyclic lactams;
(b) one or more non-bulky organosilicon-containing monomers;
(c) one or more bulky siloxane monomers; and
(d) a crosslinking agent mixture comprising (i) about 0.05 to about 2 wt. %, based on the total weight of the monomeric mixture, of one or more first crosslinking agents containing at least two ethylenically unsaturated reactive end groups, wherein the at least two ethylenically unsaturated reactive end groups are (meth)acrylate-containing reactive end groups, and (ii) about 0.01 to about 3 wt. %, based on the total weight of the monomeric mixture, of one or more second crosslinking agents containing at least two ethylenically unsaturated reactive end groups, wherein at least one of the ethylenically unsaturated reactive end groups is a non-(meth)acrylate reactive end group;
wherein the one or more second crosslinking agents are represented by the following structure:

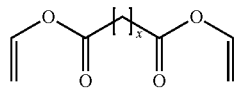

wherein x is from 2 to 10.

22. The water extractable ophthalmic device of claim 21, wherein the monomeric mixture comprises:
(a) about 42 wt. % to about 55 wt. %, based on the total weight of the monomeric mixture, of the one or more cyclic lactams;
(b) about 5 to about 25 wt. %, based on the total weight of the monomeric mixture, of the one or more non-bulky organosilicon-containing monomers; and
(c) about 10 to about 45 wt. %, based on the total weight of the monomeric mixture, of the one or more bulky siloxane monomers.

23. The water extractable ophthalmic device of claim 21, wherein the monomeric mixture further comprises a minor amount of 2-hydroxyethyl methacrylate (HEMA).

24. The water extractable ophthalmic device of claim 21, wherein the monomeric mixture further comprises an ultraviolet (UV) blocker.

25. The water extractable ophthalmic device of claim 23, wherein the monomeric mixture further comprises a UV blocker.

26. The water extractable ophthalmic device of claim 21, wherein the monomeric mixture further comprises a diluent.

27. The water extractable ophthalmic device of claim 26, wherein the diluent comprises one of a boric acid ester of a $C_1$ to $C_8$ monohydric alcohol and a $C_1$ to $C_5$ monohydric alcohol.

28. The water extractable ophthalmic device of claim 21, wherein the water extractable ophthalmic device is a contact lens.

29. The water extractable ophthalmic device of claim 21, wherein the water extractable ophthalmic device is a hydrogel.

30. The water extractable ophthalmic device of claim 21, wherein an amount of the one or more cyclic lactams present in the monomeric mixture is an amount of no more than about 55 wt. %, based on the total weight of the monomeric mixture.

31. The water extractable ophthalmic device of claim 21, wherein the one or more cyclic lactams are selected from the group consisting of N-vinyl-2-pyrrolidone, N-vinyl caprolactam, N-vinyl-2-piperidone and mixtures thereof.

32. The water extractable ophthalmic device of claim 21, wherein the one or more non-bulky organosilicon-containing monomers comprise a compound represented by the following structure:

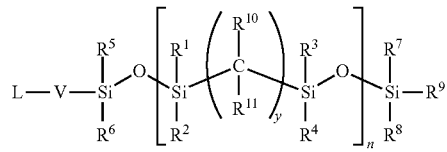

wherein L is ethylenically unsaturated polymerizable group, V is a linker group or a bond; $R^1$, $R^2$, $R^3$, $R^4$, $R^5$, $R^6$, $R^7$, $R^8$, and $R^9$ are independently hydrogen, alkyl, halo alkyl, cyclo alkyl, heterocyclo alkyl, alkenyl, halo alkenyl, or aromatic; $R^{10}$ and $R^{11}$ are independently hydrogen or alkyl wherein at least one of $R^{10}$ and $R^{11}$ is hydrogen; y is 2 to 7 and n is 1 to 100, or a compound represented by the following structure:

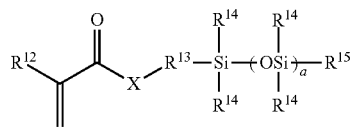

wherein $R^{12}$ is H or methyl; X is O or $NR^{16}$; wherein $R^{16}$ is hydrogen or $C_1$ to $C_4$ alkyl, which may be further substituted with one or more hydroxyl groups; $R^{13}$ is a divalent alkyl group, which may further be functionalized with a group selected from the group consisting of an ether group, a hydroxyl group, a carbamate group and combinations thereof; each $R^{14}$ is independently a phenyl or $C_1$ to $C_4$ alkyl which may be substituted with fluorine, hydroxyl or an ether; $R^{15}$ is a $C_1$ to $C_4$ alkyl; and a is 2 to 50.

33. The water extractable ophthalmic device of claim 21, wherein the one or more bulky siloxane monomers are represented by the following structure:

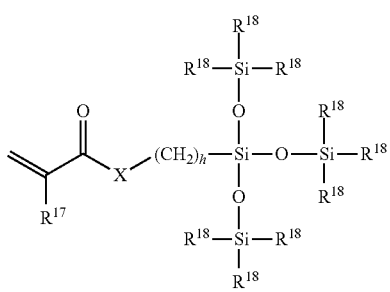

wherein X denotes —O— or —NR$^{19}$—; wherein R$^{19}$ denotes hydrogen or a C$_1$-C$_4$ alkyl where each R$^{19}$ is hydrogen or a C$_1$-C$_4$ alkyl; R$^{17}$ independently denotes hydrogen or methyl; each R$^{18}$ independently denotes a C$_1$-C$_6$ alkyl radical, a phenyl radical or a group represented by the following structure:

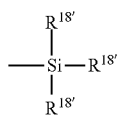

wherein each R$^{18'}$ independently denotes a C$_1$-C$_6$ alkyl radical or a phenyl radical; and h is 1 to 10; or the following structure:

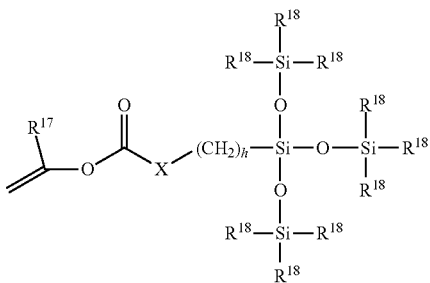

wherein X denotes —NR$^{19}$—; wherein R$^{19}$ denotes hydrogen or a C$_1$-C$_4$ alkyl; R$^{17}$ denotes hydrogen or methyl; each R$^{18}$ independently denotes a C$_1$-C$_6$ alkyl radical, a phenyl radical or a group represented by the following structure:

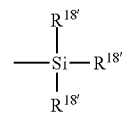

wherein each R$^{18'}$ independently denotes a C$_1$-C$_6$ alkyl radical or a phenyl radical; and h is 1 to 10.

34. The water extractable ophthalmic device of claim 21, wherein the one or more first crosslinking agents are selected from the group consisting of an alkylene glycol-containing di(meth)acrylate crosslinking agent, an alkylene glycol-containing tri(meth)acrylate crosslinking agent, an alkylene glycol-containing tetra(meth)acrylate crosslinking agent and mixtures thereof.

35. The water extractable ophthalmic device of claim 21, having an equilibrium water content of from about 50 wt. % to about 70 wt. %.

36. The water extractable ophthalmic device of claim 21, having an equilibrium water content of from about 50 wt. % to about 70 wt. %, a contact angle of from about 30° to about 50°, and an oxygen permeability of at least about 70 Barrers.

37. The water extractable ophthalmic device of claim 21, having an equilibrium water content of from about 55 wt. % to about 65 wt. %, a contact angle of from about 30° to about 45°, and an oxygen permeability of at least about 70 Barrers.

38. The water extractable ophthalmic device of claim 21, further having a water extractable content of less than about 15 wt. %.

* * * * *